Sept. 17, 1968  J. E. WEYAND ET AL  3,401,799

STACKED FILTER PLATES HAVING PREFILTERS AND FINAL FILTERS

Filed March 21, 1966

INVENTORS
JOHN E. WEYAND
JOHN H. BUSH
PER L.F. FEYLING

Pennie Edmonds
Morton, Taylor & Adams
ATTORNEYS

3,401,799
STACKED FILTER PLATES HAVING PREFILTERS AND FINAL FILTERS

John E. Weyand and John H. Bush, Needham, and Per L. F. Feyling, Belmont, Mass., assignors to Millipore Filter Corporation, Bedford, Mass., a corporation of Massachusetts
Filed Mar. 21, 1966, Ser. No. 535,946
8 Claims. (Cl. 210—344)

ABSTRACT OF THE DISCLOSURE

A filter plate unit having an inlet-outlet filter plate and a filter transfer plate disposed in stacked relation with the inlet-outlet plate having first passageways therethrough from one edge to the side facing the transfer plate and second, distinct passageways therethrough from another edge to the opposite side thereof, and filters disposed on both sides of the inlet-outlet plate.

---

This invention relates to disk-like filter plates of the type having inner and outer rims, and means for passing liquid through filters supported between the rims which may be arranged in stacks within a casing or housing. The filter plates of the invention may be used alone or in combination with other filtering equipment or they may be arranged in pairs or in multiples of the pairs when one pair is stacked over another and mounted in a case into which unfiltered liquid is forced and through the filters and filtered liquid is removed.

The filter plates are especially suitable for use with microporous plastic membrane filters but may be used with various filters such as paper filters or fibrous filters, or a combination of such filters. The filter plates are constructed and arranged to be used in pairs for prefiltering the liquid and then subjecting it to a final filtering with a microporous plastic membrane filter having pore openings for the removal of microorganisms and the like from liquids.

Each filter plate has a central opening which when they are arranged in a stack, provides a central duct for the flow of liquid. A preferred case for a stack of the filter plates has an annular space for introducing the liquid to be filtered and passing it through the filters on the filter plates and out through the duct.

One filter plate (hereinafter called the inlet-out filter plate) comprises an outer and an inner rim which are connected together by an integral imperforate disk-like web. The outer rim has several inlet holes for passing unfiltered liquid into the filter plate on one side of the web and several outlet holes in the inner rim of the opposite side of the web for passing filtered liquid out of the filter plate. The other filter plate (hereinafter called the transfer filter plate) has an integral web connecting both rims which has several holes for the passage of liquid from one side to the other. Both filter plates have rims with opposite flat, preferably parallel, surfaces, to one surface a flat perforated metal filter support is secured as by welding, and the opposite flat surfaces of the rims have grooves for a sealing means and are recessed, and another perforated metal filter support is secured as by welding to the recessed surfaces. The perforated filter supports are spaced from the webs leaving cavities for a means to support the perforated filter supports, and for the flow of liquid therethrough. When the pairs of filter plates are arranged in superposed position the flat surfaces of one filter plate bear on a filter support of the other filter plate of the pair, and to minimize leakage of the liquid the grooves are preferably provided with O-rings.

The pair of filter plates of this invention are particularly suited for use with a prefilter and a final microporous plastic membrane filter. In assembling a stack of the filter plates an inlet-outlet filter plate is first positioned on a support in the case and a final filter is placed thereover. Then a transfer filter plate is placed over the final filter with the O-rings in sealing contact therewith and with the flat surfaces of the inner and outer rims over the final filter. Then a prefilter such as a mat or felted layer of bonded glass fibers is placed over the perforated filter support of the transfer filter plate. The inner diameter of this prefilter is just slightly larger than the diameter of the O-ring of the inner rim so that the O-ring does not bear on the prefilter but effects sealing directly on the perforated filter support. This construction prevents bleeding of unfiltered liquid through the pores of the prefilter into the filtered liquid flowing through the outlet duct. However, the prefilter extends under the O-ring of the outer rim.

The unfiltered liquid flows through the holes in the rim of the inlet-outlet filter plate and into the space between the web and the filter support on the recessed surfaces and through the prefilter and its perforated support. The liquid then flows through the holes in the web of the transfer filter plate, through the final filter and its filter support and out through the holes in the rim of the inlet-outlet filter plate and into the central discharge duct.

One of the important features of this invention is the recess on one side of each rim of each filter plate which enables the unrecessed flat surfaces to engage the filter or filter support of the subjacent filter plate and thereby provide a space between the filter plate and the filter on the support. This space under the inlet-outlet filter plate provides a space for the prefilter. Also the space under the transfer filter plate minimizes the obstruction of liquid flowing through the final filter but more importantly the filter supports on both sides of the final filter will support the delicate microporous plastic filters during the surge of a sudden back pressure.

Figure 1:
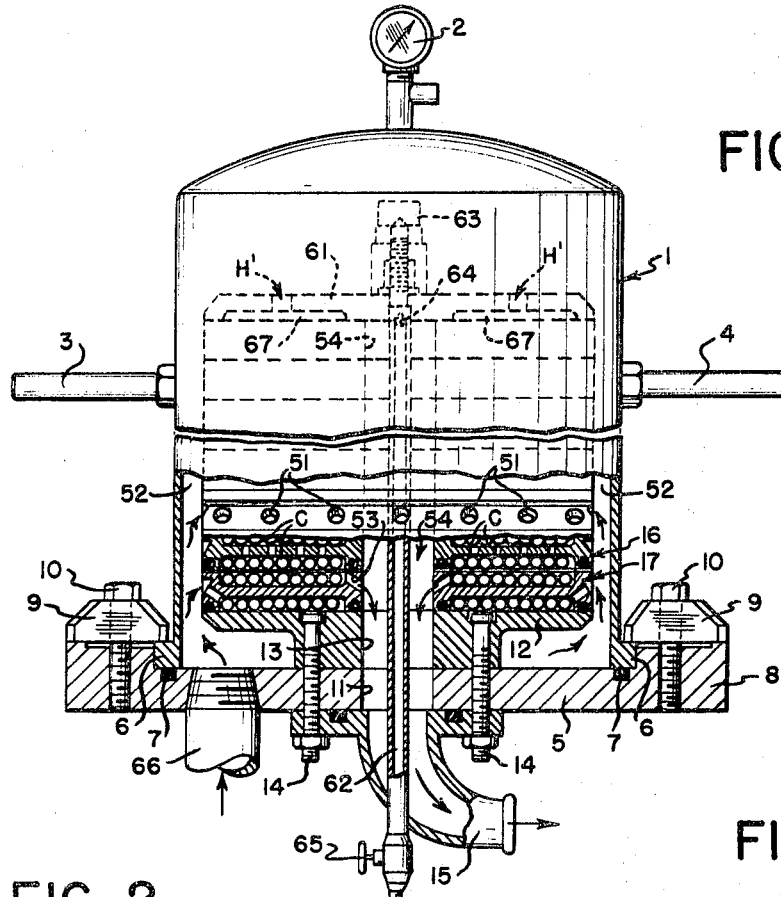
FIG. 1 is a side view, partly in section, of an assembly in a case of pairs of filter plates of the invention.
Figure 2:
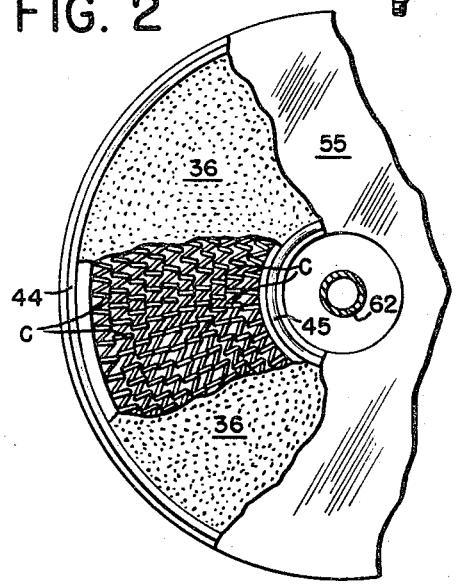
FIG. 2 is a plan view with parts removed illustrating the arrangement of perforated filter supports and the means for supporting the perforated filter supports.

FIG. 1 illustrates an assembly of pairs of filter plates of the invention comprising a metal case 1 having a combination pressure gauge and relief valve 2 at the top and handles 3 and 4 for lifting the case off and placing it on its base 5. The case has an annular flange 6 resting on the sealing O-ring 7 and the base has an annular shoulder 8 for a plurality of clamps 9 which bear on the flange and press it into sealing contact with the O-ring on the base by means of bolts 10.

The center of the base has an opening 11 and the filter plate platform 12 having an opening 13 is secured to the base by bolts 14. The under surface of the base has a curved outlet pipe fitting 15 secured thereto by the same bolts.

Figure 3:
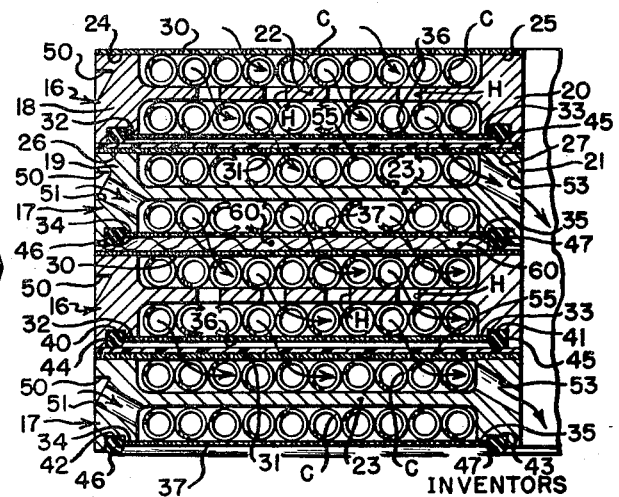
FIG. 3 is an enlarged sectional view of one-half of two pairs of the filter plates.

As best shown in FIG. 3 the pair of filter plates comprises a transfer filter plate 16 and an inlet-outlet filter plate 17 each of which has an outer rim 18, 19 and an inner rim 20, 21 connected by an integral web 22 and 23 respectively. The filter plates have opposite flat parallel surfaces 24, 25 and 26, 27 on one side on which perforated filter supports 30 and 31 are secured as by welding respectively. The opposite sides are recessed forming flat, preferably parallel, surfaces 32, 33 and 34, 35 on which perforated filter supports 36 and 37 are secured as by welding respectively. The recessed surfaces have grooves 40, 41 and 42, 43 in which are mounted sealing O-rings 44, 45 and 46, 47 respectively. The outer rims have finger notches 50 to facilitate handling the filter plates.

The perforated filter supports are preferably made of stainless steel and have a vast multiplicity of holes which are preferably about 0.010 inch in diameter, preferably made by a photoetching technique.

The web 22 of the transfer filter plate 16 is spaced from the filter supports 30 and 36 and concentric coils of wire C are mounted in the spaces to support the filter supports at a multiplicity of points. The web has several holes H through which liquid can flow from one side to another. The inlet-outlet filter plate 17 has an imperforate web 23 which forms a space with the perforated filter support 31 on one side and another space with the perforated filter support 37 on the opposite side, and in each space concentric wire coils C are mounted to support the perforated filter supports at a multiplicity of points.

The copending patent application of John H. Bush, Ser. No. 418,428, filed Dec. 15, 1964, now Patent No. 3,306,459, is directed to a filter plate having a perforated screen for supporting the filter which is supported at many points by several concentric coils of wire mounted in the plate under the perforated filter support, and this invention preferably employs such supporting coils of wire C to support the perforated filter supports of each filter plate.

The outer rim 19 has a plurality of holes 51 through which unfiltered liquid enters from the annular space 52 inside the case 1, and the inner rim 21 has a plurality of holes 53 through which filtered liquid is discharged into the central duct 54 inside the stack of filter plates.

The multiplicity of pairs of filter plates arranged as in FIG. 1 is assembled by placing an inlet-outlet filter plate 17 on the support 12 and a microporous plastic membrane filter 55 having pore holes varying, say, from 0.01 to 14 microns and a total pore volume of about 80% is placed on the filter support 31. Then a transfer filter plate is placed over the plastic filter 55 so that the O-rings 44 and 45 bear on the filter. It will be noted that filter support 36 is spaced from the filter to provide for a better flow of liquid. However, this space is sufficiently narrow that the support 36 can support the filter in the event of a back pressure. A prefilter 60 formed of bonded glass fibers or the like is placed on the filter support 30. Then an inlet-outlet filter plate 17 is placed over the prefilter with the O-ring 46 bearing on the prefilter and the O-ring 47 bearing on the filter support 30. This arrangement is repeated as required. The pressure plate 61 is then placed on top of the last filter plate and the hollow rod 62 is inserted up through the duct 54 and the nut 63 is tightened to press all the O-rings of the stack into sealing contact. The hollow rod has a bleed hole 64 for the escape of air during the initial charging and then the valve 65 is closed.

The unfiltered liquid is forced through pipe 66 into the annular space 52 and then through the holes 51 in the inlet-outlet filter plates. The liquid flows through a prefilter 60 and its perforated support 30, through the holes H in the support 36 and the final filter 55 and out the holes 53 into the duct 54 and fitting 15. The pressure plate 61 has an annular groove 67 which receives liquid through holes H' to equalize pressure on the uppermost filter plate.

We claim:

1. A pair of filter plates adopted to be disposed in superposed relation for holding filters therebetween and one of which is an inlet-outlet filter plate and the other a transfer filter plate, each filter plate having an outer rim and an inner rim, an integral web interconnecting the rims of each filter plate, the inlet-outlet filter plate having several holes for incoming unfiltered liquid in the outer rim on one side of the web and several holes in the inner rim on the opposite side of the web for the removal of filtered liquid, the rims of each filter plates having flat surfaces on the opposite sides, a flat perforated support for a filter attached to the flat surfaces on the rims on one side of said plates, the flat surfaces on the opposite side of the rims being recessed and having a flat perforated filter support attached thereon, means in the spaces between the webs and the filter supports which support the filter supports at a multiplicity of points; the transfer filter plate having a web with several holes therethrough for the passage of liquid, and means to seal the inner and outer rim portions of the adjacent filter plates.

2. A pair of filter plates as defined in claim 1 in which there is a final filter between said plates and a space between the final filter and the filter support on the transfer filter plate thereover.

3. A pair of filter plates as defined in claim 1 which comprises a prefilter overlying the filter support on the transfer filter plate, and a final filter overlying the filter support on the inlet-outlet filter plate.

4. A pair of filter plates as defined in claim 3 which comprises O-rings as the sealing means mounted in grooves in the inner and outer rims, the O-rings of the outer rims of the inlet-outlet filter plate bearing directly on the prefilter which is so proportioned that the O-rings of the inner rims of the inlet-outlet filter plate do not bear on the prefilter but bear on the filter support of the subjacent filter plate, the O-rings of the transfer filter plate bearing directly on the final filter of the subjacent filter plate.

5. A pair of filter plates as defined in claim 1 in which the filter supports are sheet metal screens welded to the rims.

6. A series of pairs of filter plates stacked one over the other in a surrounding case, the pairs of filter plates being arranged in alternate position, each filter plate having an outer rim and an inner rim with flat surfaces, a perforated support for each filter secured to the surfaces, a prefilter over the support of one filter plate and a microporous plastic membrane filter over the support of the other filter plate, the other of said filter plates having a first and second space between the inner and outer rims thereof, said first and second spaces being isolated from each other with said microporous plastic membrane filter overlying said first space and said prefilter underlying said second space, means for sealing the filters between the adjacent rims, passages in the outer rim of the other filter plate leading into said second space between the inner and outer rims thereof for passing liquid from a space inside the case surrounding the filter plates and through the prefilter, the one filter plate and then through the microporous membrane filter, a hollow space inside the inner rims of both filter plates for the removal of filtered liquid, passages in the inner rim of the other filter plate leading from said first space between the inner and outer rings thereof for removing liquid which passes through the microporous plastic membrane filter and into the hollow space, and means for removing filtered liquid from the case.

7. A series of filter plates as defined in claim 6 which comprises a perforated filter support secured to the interior and exterior rims of one filter plate for supporting the membrane filter, and a perforated filter support for the prefilter which is secured to the interior and exterior rims of the other filter plate.

8. Several pairs of filter plates stacked within a case one being an inlet-outlet filter plate and the other a transfer filter plate, each filter plate having an inner rim and an outer rim with flat surfaces on one side, a filtered support secured to each flat surface, recessed flat surfaces on the opposite side on which flat perforated filter supports are secured, a prefilter overlying a filter support of said transfer plate with its outer periphery at least partially overlying the outer rim thereof and its inner periphery only partly overlying the inner rim thereof, a sealing means bearing on the prefilter between the outer rims of both filter plates and another sealing means between the inner rims of both filter plates and inward of the prefilter, a final filter overlying a filter support on the rims of the inlet-outlet filter plate, said inlet-outlet filter plate having a first space between the inner and outer rims thereof overlying said prefilter, and a second space isolated from said first space and underlying said final filter, means for passing unfiltered liquid through the outer rim of the inlet-outlet filter and into said first space through the prefilter, through the transfer filter plates, through the final filter and into said second space, a duct inside the inner rims of the filter plates, and means to pass the liquid from said second space into the duct.

References Cited

UNITED STATES PATENTS

| | | | |
|---|---|---|---|
| 367,212 | 7/1887 | Klein | 210—343 |
| 2,536,690 | 1/1951 | Miller | 210—344 |
| 2,754,973 | 7/1956 | Muller | 210—457 X |
| 3,206,034 | 9/1965 | Anderson | 210—347 |
| 3,240,344 | 3/1966 | Hoelscher | 210—344 X |
| 3,306,459 | 2/1967 | Bush | 210—345 X |
| 915,695 | 3/1909 | Perrin | 210—335 X |

FOREIGN PATENTS

| | | |
|---|---|---|
| 740,455 | 10/1943 | Germany. |
| 107,192 | 10/1924 | Switzerland. |
| 2,931 | 1897 | Great Britain. |

REUBEN FRIEDMAN, *Primary Examiner.*

F. SPEAR, *Assistant Examiner.*